3,595,888
PRODUCTION OF GLYCERYL
MONOALKANOATES
Raymond Reiser and Arthur Furman Isbell, College Station, Tex., assignors to Research Corporation, New York, N.Y.
No Drawing. Filed May 13, 1968, Ser. No. 728,823
Int. Cl. C07d 13/04; C11c 3/04
U.S. Cl. 260—410.7
6 Claims

ABSTRACT OF THE DISCLOSURE

Glyceryl monoalkanoates are made by heating triglycerides of saturated or unsaturated alkanoic acids with at least two moles of isopropylidene glycerol at from about 100° to about 200° C. and hydrolyzing the monoalkanoates of isopropylidene glycerol thereby produced to glyceryl monoalkanoates. The reaction of the isopropylidene glycerol with the triglycerides is catalyzed by acids and alkaline substances. The isopropylidene glycerol may be preformed or formed in the presence of the triglycerides by condensation of glycerol and acetone by azeotropic distillation of water of condensation.

---

The invention relates to the production of mono fatty acid esters of glycerol from the triglycerides contained in commercially available fats and oils.

Fatty acid monoglycerides are excellent edible emulsifying agents and have other valuable commercial uses. Common impurities in the commercial products are the corresponding fatty di- and triglycerides which are undesirable because they possess little or no emulsifying activity. Present commercial production of monoglycerides usually involves esterifying fatty acids with an excess of glycerol or heating triglycerides with glycerol in the presence of an esterification catalyst. However, such reactions proceed to an equilibrium mixture containing only about 35 to 40% of monoglyceride the remainder of the product being the undesired di- and triglycerides. Adding certain solvents results in some improvement in the yield of monoglyceride but much di- and triglycerides still remain in the product and difficulty is encountered in removing the solvents completely.

The method of the invention results in the production of fatty acid monoglycerides in high yields and in purities of 90% or higher.

The method of the invention comprises heating commercially available fats and oils which are largely triglycerides of saturated or unsaturated alkanoic acids, such as oleic, stearic, palmitic and linoleic acids, at a temperature of from about 100° C. to about 200° C. with at least two moles of isopropylidene glycerol and hydrolyzing the mono fatty acid esters of isopropylidene glycerol thereby produced to give monoglycerides and acetone. The preparation of the mono fatty acid esters of isopropylidene glycerol is catalyzed by acidic and alkaline substances. The isopropylidene glycerol may be preformed or formed in the presence of the triglyceride by condensation of glycerol and acetone by azeotropic distillation of water of condensation using low boiling azeotroping agents, such as dichloromethane, chloroform, or pentane, or other liquids which form water-containing binary azeotropes boiling below the boiling point of acetone.

The monoesters of isopropylidene glycerol thus obtained can readily be hydrolyzed into fatty acid monoglycerides and acetone by heating with a saturated aqueous solution of sodium bisulfite and separating the monoglycerides from the aqueous solution by centrifugation.

The following examples are illustrative of the principles of the invention:

EXAMPLE 1

A mixture of 147.5 grams of olive oil, 64.2 grams of glycerol, 53.5 grams of acetone and 2 grams of p-toluenesulfonic acid is heated with stirring in a vessel fitted with a reflux condenser and phase separator. Dichloromethane is added until the reaction temperature is reduced to 70° C. Refluxing is continued until approximately 18 milliliters of water is collected in the phase separator and the reaction temperature increases to approximately 105° C. The phase separator is then replaced by a chamber packed with silica gel arranged so that the condensate from the reaction vessel is caused to pass through a silica gel and refluxing is continued for about 17 hours to remove the last of the water of reaction. Two grams of calcium carbonate powder is then added to the reaction mixture with stirring for about an hour to neutralize the free acid. The mixture is then filtered and vacuum distilled giving an excellent yield of isopropylidene glyceryl oleate.

50 grams of isopropylidene glyceryl oleate prepared in this manner and 30 milliliters of a saturated aqueous solution of sodium bisulfite is stirred at 55° C. for 1 to 2 hours and the resulting glyceryl monooleate is separated from the aqueous acetone-bisulfite solution by centrifugation. The monooleate is readily converted to glyceryl monostearate by catalytic hydrogenation with nickel, platinum or palladium catalysts.

EXAMPLE 2

A mixture of 141.5 grams of isopropylidene glycerol and 1.5 grams of sodium metal is stirred and warmed until the sodium dissolves. To this solution 147.5 grams of olive oil are added and the mixture is heated to 160° C. with stirring under nitrogen. After about ½ hour thin layer chromatography shows that the triglyceride has been almost quantitatively converted to the corresponding isopropylidene glyceryl oleate and glyceryl monooleate. To convert the latter to a distillable compound, 13.5 grams of p-toluenesulfonic acid and 25 milliliters of acetone are added and the mixture is refluxed with chloroform in a vessel fitted with a condenser and a phase separator until 5.5 milliliters of water are removed and the temperature approaches 200° C. An excess of powdered sodium carbonate is added to neutralize the acid, the reaction mixture is filtered and the filtrate is distilled in vacuum giving a nearly quantitative yield of isopropylidene glyceryl monooleate which may be hydrolyzed to glyceryl monooleate as in Example 1.

Instead of converting the glyceryl monooleate in the alkali-catalyzed reaction mixture to the corresponding isopropylidene derivative as described above, the mixture may be carefully neutralized at room temperature and the excess isopropylidene glycerol and lower boiling substances present in the reaction mixture may be removed by flash distillation leaving a residue consisting substantially of glyceryl monooleate and isopropylidene glyceryl monooleate. The isopropylidene group may be hydrolyzed from the latter compound by treating the residue with a saturated solution of sodium bisulfite leaving substantially pure glyceryl monooleate. In this procedure the speed and completeness of the alkali-catalyzed reaction may be increased by increasing the proportion of isopropylidene glycerol, for example, to twice the amount specified above.

EXAMPLE 3

To a reaction vessel fitted with a condenser and phase separator are added 221 grams of olive oil, 115 grams of glycerol, 100 milliliters of dichloromethane and 5 grams of p-toluenesulfonic acid. The mixture is heated under reflux while 116 grams of acetone are added slowly during a period of about 7 hours while 9 milliliters of water are removed. More dichloromethane is added if necessary to maintain the reaction temperature between 80° C. and 117° C. until a total of 32 milliliters of water is recovered. 5 grams of sodium carbonate are added to neutralize the acid and, after removing dichloromethane, excess acetone and water under vacuum, the residual liquid is vacuum distilled yielding 89 grams of isopropylidene glycerol, about 271 grams of isopropylidene glyceryl oleate and about 21 grams of undistilled residue.

EXAMPLE 4

A mixture of 222 grams of hydrogenated cottonseed oil, 69 grams of glycerol, 87 grams of acetone, 8.7 grams of p-toluenesulfonic acid is heated under reflux in a vessel fitted with a condenser and phase separator, with enough dichloromethane to give the mixture an initial boiling point of 76°, until 25.2 milliliters of water is removed. To the product are added 2 grams of Norit A and 5 grams of powdered calcium carbonate. The volatile components are removed by heating on a steam bath under a pressure of 30 mm. Hg. The residue is filtered and the filtrate is vacuum distilled to give isopropylidene glycerol (about 61 grams) and 216 grams of isopropylidene glyceryl stearate.

We claim:

1. A method of making glyceryl mono fatty acid esters which comprises heating a fat or oil consisting essentially of triglycerides of at least one of the acids: oleic, stearic, palmitic and linoleic with at least two moles of isopropylidene glycerol at from about 100° to about 200° C. and hydrolyzing the mono fatty acid ester of isopropylidene glycerol thereby produced to form glyceryl mono fatty acid ester.

2. A method as defined in claim 1 wherein the isopropylidene glycerol is formed in the reaction mixture by condensation of glycerol and acetone by azeotropic distillation of water of condensation in the presence of an acidic catalyst.

3. A method as defined in claim 1 wherein the heating of the triglyceride with the isopropylidene glycerol is carried out in the presence of an alkaline catalyst.

4. A method as defined in claim 1 wherein the mono fatty acid ester of isopropylidene glycerol is distilled from the reaction mixture prior to hydrolysis thereof.

5. A method as defined in claim 1 wherein the mono fatty acid ester of isopropylidene glycerol is hydrolyzed to glyceryl mono fatty acid ester by heating with aqueous sodium bisulfite solution.

6. A method of making glyceryl mono fatty acid esters which comprises heating an isopropylidene glyceryl mono fatty acid ester of oleic, stearic, palmitic or linoleic acid with aqueous sodium bisulfite solution.

References Cited

UNITED STATES PATENTS 2,619,493  11/1952  Norris _____ 260—410.7
3,435,024  3/1969   Nobile et al. _____ 260—210

OTHER REFERENCES

Anfinsen et al., Prepartion of α-Monoglycerides, J. Am. Oil Chemists, Soc. 41, pp. 779–80.

LEWIS GOTTS, Primary Examiner

D. G. RIVERS, Assistant Examiner

U.S. Cl. X.R.

260—340.9